US012801311B2

(12) United States Patent
Partsch

(10) Patent No.: US 12,801,311 B2
(45) Date of Patent: Nov. 17, 2026

(54) SYSTEMS AND METHODS WITH CONCURRENT LINK-TIMING CALIBRATION

(71) Applicant: Rambus Inc., San Jose, CA (US)

(72) Inventor: Torsten Partsch, San Jose, CA (US)

(73) Assignee: Rambus Inc., San Jose, CA (US)

( * ) Notice: Subject to any disclaimer, the term of this patent is extended or adjusted under 35 U.S.C. 154(b) by 17 days.

(21) Appl. No.: 18/649,159

(22) Filed: Apr. 29, 2024

(65) Prior Publication Data

US 2024/0385777 A1 Nov. 21, 2024

Related U.S. Application Data

(60) Provisional application No. 63/502,455, filed on May 16, 2023.

(51) Int. Cl.
*G06F 3/06* (2006.01)
*G06N 20/00* (2019.01)

(52) U.S. Cl.
CPC ............ *G06F 3/0659* (2013.01); *G06F 3/061* (2013.01); *G06F 3/0673* (2013.01); *G06N 20/00* (2019.01)

(58) Field of Classification Search
CPC ....... G06F 3/061; G06F 3/0659; G06F 3/0673
See application file for complete search history.

(56) References Cited

U.S. PATENT DOCUMENTS 6,889,304 B2 5/2005 Perego et al.
8,121,237 B2 2/2012 Stott et al.
8,667,347 B2 3/2014 Zerbe et al.
10,705,989 B2 7/2020 Ware et al.
10,789,185 B2 * 9/2020 Giovannini ......... G06F 13/1689
11,276,440 B2 3/2022 Perego et al.
11,474,957 B2 10/2022 Shaeffer et al.
2017/0091040 A1 * 3/2017 Wright .................. G06F 3/0683
2018/0285013 A1 * 10/2018 Rajan .................... G06F 3/0613

OTHER PUBLICATIONS

Hynix, "1gB (32mX32) GDDSGRAM," H5GQ1H24AFR Rev. 1.0/Nov. 2009 (173 pages).
JEDEC, "GDDR5 SGRAM," JESD212 JEDEC Solid State Technology Association, Dec. 2009 (138 pages).
Murdock, Brett "Advantages Of LPDDR5: A New Clocking Scheme," downloaded from https://semiengineering.com/advantages-of-lpddr5-a-new-clocking-scheme/, Sep. 5, 2029 (8 pages).
NXP Semiconductors, "S32Gx DRAM Content Retention," Document No. AN13636, Rev. 0, Jul. 2022 (11 pages).

* cited by examiner

*Primary Examiner* — Yong J Choe
(74) *Attorney, Agent, or Firm* — Silicon Edge Law Group LLP; Arthur J. Behiel

(57) ABSTRACT

A memory system includes a memory controller in communication with a memory device via a communication links and a memory interface that can be retrained without interrupting memory access. In a normal operating mode, the entire interface is available to the controller in service of access (read and write) requests. When retraining is required, the memory controller commands the memory device to enter a training mode that divides the interface functionally into two parts that operate concurrently, one that is retrained and another that services normal access requests. The training mode offers a reduced data rate, relative to the normal mode, but also reduced latency relative to interrupting data traffic altogether for training.

14 Claims, 7 Drawing Sheets

SYSTEMS AND METHODS WITH CONCURRENT LINK-TIMING CALIBRATION

FIELD OF THE INVENTION

The subject matter presented herein relates generally to high-speed signaling links within and between integrated-circuit devices.

BACKGROUND

Computational systems include processors and memories. The processors read data from the memories, process that data to come up with new data, and write the new data back to the same or different memories. A processor communicates with a memory via a command/address interface (CA) and a data interface (DQ), each of which is connected to a corresponding interface on the memory via conductive paths called "links." The CA interface is used to send commands and addresses to the memory, e.g. a read command that seeks data stored in a particular address in the memory. The DQ interface is used to communicate data, e.g. the data requested from an address in the memory.

Processors and memory are synchronized using a clock signal that is either conveyed between devices or derived from a received signal (e.g. from a DQ signal). Error-free signal reception is very sensitive to the clock rate and phase. Interfaces between processors and memory are therefore carefully trained, or calibrated, so that processors and memory communicate with precise timing.

Modern clock signals have a period on the order of under one nanosecond, and both the phase and frequency of clock signals can drift with e.g. temperature, humidity, and supply-voltage. Memory interfaces require periodic retraining to account for such changes. Unfortunately, interface retraining interrupts normal memory operations. As speeds increase, retraining memory interfaces becomes increasingly difficult. Performance degradation, never beneficial in the context of computing, is particularly troublesome where low latency is paramount. Advanced Driver Assistance Systems (ADAS) are a good example.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
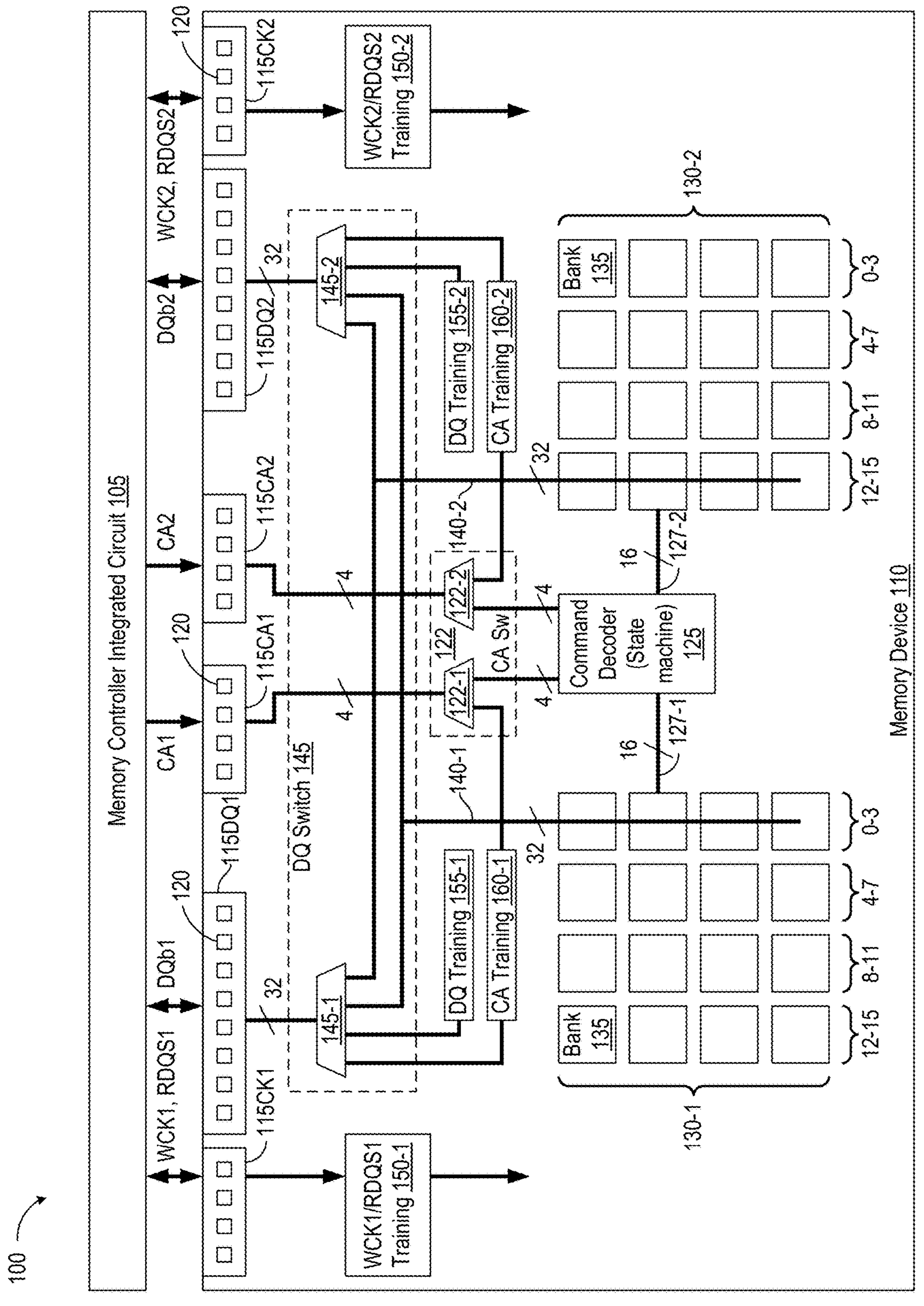
FIG. 1 depicts a memory system 100 in which a memory controller 105 communicates with a memory device 110 via an interface 115 that can be retrained without interrupting memory access.

FIG. 1 depicts a memory system 100 in which a memory controller 105 communicates with a memory device 110 via an interface 115 that can be retrained without interrupting memory access. In a normal operating mode, the entire interface is available to controller 105 in service of access requests (e.g., read and write requests). When retraining is required, controller 105 issues a command that places the interface in a training mode that divides the interface functionally into two parts that operate concurrently, one that is retrained and another that services normal access requests. The training mode offers a reduced data bandwidth, relative to the normal mode, but also reduced latency relative to interrupting data traffic altogether for training.

Elements of interface 115 have the common prefix "115" and include a command/address (CA) interface 115CA, a data interface 115DQ, and a clock interface 115CK. Each of these interfaces is divisible into two ports, a first port on the left designated with the suffix "1" and a second port on the right designated with the suffix "2". For example, CA interface 115CA is divisible into first and second command ports 115CA1 and 115CA2, each of which receives commands and addresses on a set of four pads 120 that connect memory device 110 to controller 105 via corresponding CA links CA1 and CA2. Two eight-pad data ports 115DQ1 and 115DQ2 each communicate byte-width (eight-bit) data over respective eight-bit data links DQb1 and DQb2. Two clock ports 115CK1 and 115CK2 share timing information over corresponding links WCK1, RDQS1/WCK2, RDQS2, signals WCK referring to write strobes (or clocks) from controller 105 and signals RDQS to read strobes from memory device 110. A strobe is commonly conveyed as a differential signal that accompanies a single-ended or differential signal timed to the strobe. Command/address signals and nodes may be referred to as "command" signals and nodes, or CA signals and nodes, for brevity. Address signals accompany command signals in system 100 but can be conveyed separately.

A CA switch 122 connects command ports 115CA1 and 115CA2 to a command decoder 125. In a normal operating mode, CA switch 122 connects both CA ports 115CA1 and 115CA2 to command decoder 125. Each command from controller 105 arrives at memory device 110 via both CA ports 115CA1 and 115CA2. Command decoder 125 decodes each command and responsively controls two arrays 130-1 and 130-2 of memory banks 135 via respective sixteen-bit command/address buses 127-1 and 127-2 to read or write data over 128-bit buses 140-1 and 140-2. A data switch 145 with multiplexer/demultiplexer (mux/demux) 145-1 and mux/demux 145-2 connects buses 140-1 and 140-2 to respective data ports 115DQ1 and 115DQ2 so that memory device 110 communicates 128*2=256-bit read or write data to or from controller 105. Ports 115CK1 and 115CK2 provide the requisite timing signals for read and write data. Each bank 135 includes rows and columns of memory cells (not shown), capacitive storage elements in an embodiment in which memory device 110 is a dynamic, random-access memory (DRAM).

Memory system 100 supports training modes that afford memory controller 105 read and write access to memory device 110 while portions of interface 115 undergo timing calibration, or "training." Read and write access is provided to both memory arrays 130-1 and 130-2 via half of interface 115 while the other half undergoes training. The amount of data communicated during a single memory transaction is preserved in this narrow training mode, however, the burst length of read and write transactions is doubled relative to the burst lengths in the normal, wide-data mode. In an embodiment that communicates 256-bit-data in burst lengths of four over data ports 115DQ1 and 115DQ2 in the wide-data mode, for example, one of DQ ports 115DQ1 or 115DQ2 communicates the same amount of data in burst lengths of eight in a narrow-data training mode. Both wide and narrow modes thus provide the same access granularity. The burst length of commands is likewise doubled so that complete access commands can be narrowed for delivery via only one of CA ports 115CA1 and 115CA2.

Both sides of memory device 110 include training circuitry used to calibrate the signals associated with ports 115CK1/2, 115DQ1/2, and 115CA1/2. CK training circuit 150-1 and 150-2 are used in training to adjust the phase and frequency of reference signals to and from memory device 110; DQ training circuits 155-1 and 155-2 provide and evaluate data signals for errors during DQ calibration, and CA training circuits 160-1 and 160-2 provide and evaluate CA signals for errors during CA calibration. The operation of training circuitry is well known so a detailed discussion is omitted for brevity.

The following example describes memory device 110 in a training mode in which the first half of interface 115—the left side with ports having the suffix "1"—is used for normal access to allow the second half—the right side with ports having the suffix "2"—to undergo training. Command decoder 125 receives a command on both of ports 115CA1 and 115CA2 placing device 110 in this training mode. A state machine within command decoder 125 changes the command decoding to the training mode protocol. For example, the normal protocol decodes commands arriving on both command ports 115CA 1/2 over 2 clock cycles, arrives on one command port (115CA1) over 4 clock cycles. In this example training mode memory access commands arrive on 115CA1 and training commands arrive on 115CA2. The state machine then manages memory arrays 130-1 and 130-2, CA and DQ switches 122-1 and 145-1 in response to normal access requests with the first half of interface 115, and CA and DQ switches 122-2 and 145-2, training circuitry 150-2, 155-2, and 160-2, 115DQ2, 115CA2, and 115CK2 in response to training requests from port 115CA2, on the second half of interface 115.

For normal access in the training mode, command decoder 125 receives half-width read and write commands from a demultiplexer 122-1, one of two demultiplexers 122-1 and 122-2 in CA switch 122. Command decoder 125 then controls memory arrays 130-1 and 130-2 and a multiplexer/demultiplexer (mux/demux) 145-1 to successively communicate data from each of memory arrays 130-1 and 130-2 via the same data port 115DQ1. Reads and writes proceed normally but for the half-width, double-burst length signaling on ports 115CA1 and 115DQ1. The phase and frequency of timing information on port 115CK1 is maintained at values set during an earlier training cycle.

The training mode calibrates CA port 115CA2 separate from data port 115DQ2 because both CA and DQ training employs DQ port 115DQ2 for a return channel to memory controller 105. Command decoder 125 receives half-width training commands from demultiplexer 122-2 that direct the state machine to control CA training circuitry 160-2 and mux/demux 145-2 to loop commands arriving from controller 105 via port 115CA2 back to controller 105 via DQ port 115DQ2. CA training circuitry 160-2 adjusts e.g. the phase and frequency of a clock signal used to time CA signals to adjust for drift that may have occurred since the last training cycle. Other training commands from controller 105 direct command decoder 125 to read and write training data to and from DQ training circuitry 155-2 via multiplexer 145-2 and DQ port 115DQ2 while calibrating the timing of timing reference signals WCK2 and RDQS2 via CK training circuitry 150-2.

When CA and DQ signaling is retrained on the left side of interface 115, controller 105 either applies the newly acquired calibration settings to the whole interface, or issues training commands that enable the newly trained side to service memory-access requests while currently training the right side of interface 115. Memory device 110 is symmetrical in this example so the foregoing discussion applies equally when training either side of interface 115.

Figure 2:
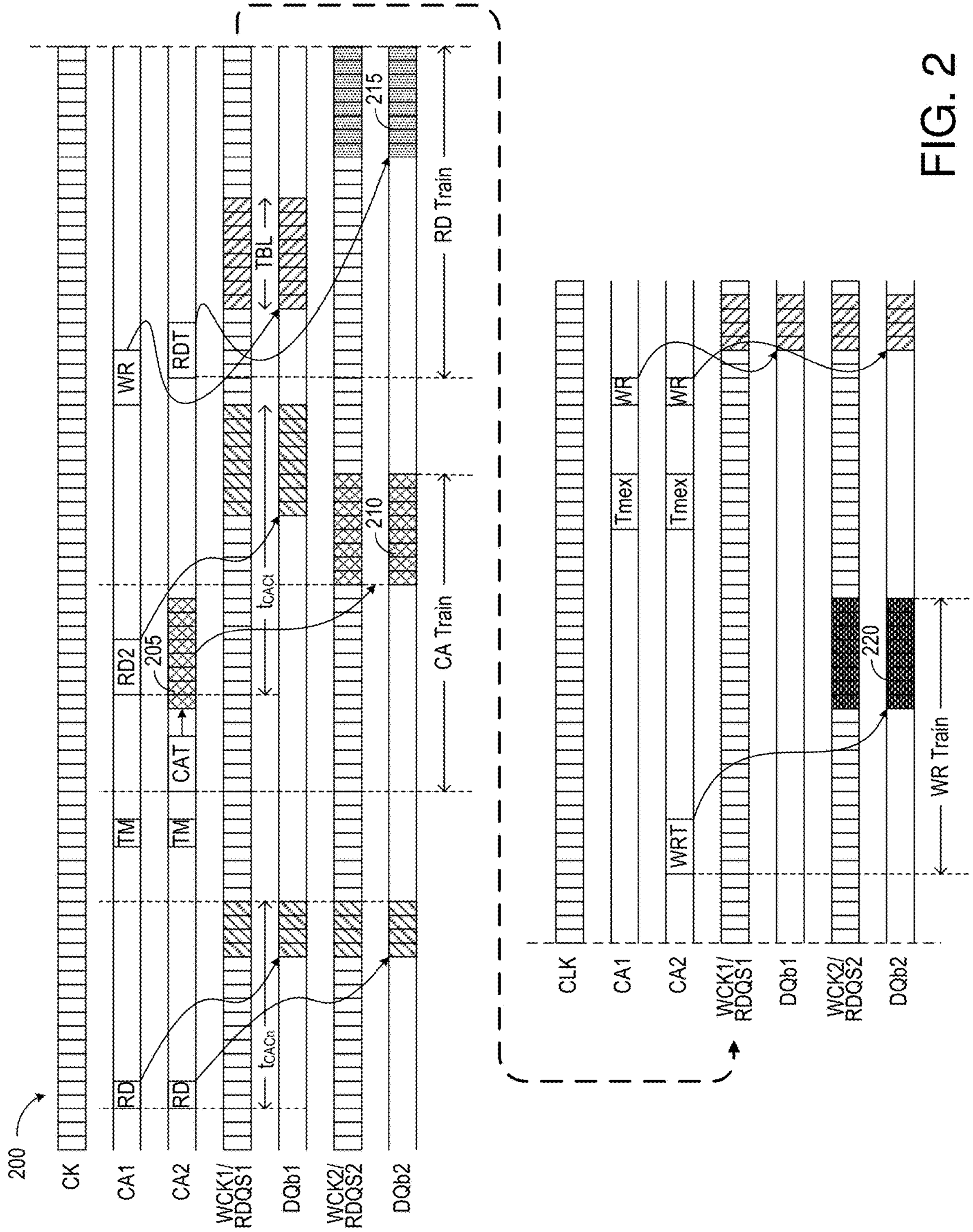
FIG. 2 is a timing diagram 200 illustrating the operation of memory system 100 of FIG. 1.

FIG. 2 is a timing diagram 200 illustrating the operation of memory system 100 of FIG. 1. Signal names refer to corresponding links between memory controller 105 and memory device 110, an exception being clock signal CK at the top of diagram 200. Clock signal CK can correspond to an actual timing reference or references on memory 110 and serves as a visual reference in diagram 200. (An example of clock signal CK is discussed later in connection with FIG. 4.)

Diagram 200 starts in a normal operating mode in which both CA ports 115CA1 and 115CA2 serve as a single port. A single read command RD is shown as a pair of sub-commands each with a burst length of two clock cycles (two periods of clock signal CK, or one period in a double-data-rate embodiment in which symbols are conveyed on rising and falling clock edges). Memory device 110 responds to the read command by delivering full-width data on links DQb1 and DQb2 at a burst length of four clock cycles to deliver 64 bits after a normal column-access time $t_{CACn}$ (Rd command to last bit of burst). The data on links DQb1 and DQb2 are timed to corresponding timing signals on CK port 115CK1 and 115CK2.

A training-mode command TM arrives on both of CA ports 115CA1 and 115CA2 to place memory device 110 in a training mode, in this instance requiring two beats of clock signal CK and both ports 115CA1 and 115CA2. This training mode reserves CA port 115CA1 and DQ port DQb1 for normal access so that CA port 115CA2 and DQ port 115DQ2 can be retrained. Retraining can calibrate equalization, phase, duty cycle, and voltage swing associated with CA port 115CA2 and DQ port 115DQ2 and can change the phase and frequency of clock signals WCK2 and RDQS2 relative to DQ signals DQb2 and CA signals CA2. In other embodiments, signals CA2 are adjusted relative to a separate timing reference (CK). While not shown, CA ports 115CA1 and CA2 receive a reference voltage (VREF) that can also be adjusted in training.

Memory access in the training mode is illustrated with a second read command RD2 on link CA1. Conveyed on only one CA port, read command RD2 is half the width of prior read command RD but delivers the same CA information over twice the beats of clock signal CK (four vs two). Second read command RD2 causes memory device 110 to issues an eight-bit burst of read data DQb1 over DQ port 115DQ1. To do so, the state machine in command decoder 125 sequences a pair of 32-bit accesses from memory arrays 130-1 and 130-2 via mux/demux 145-1, delivering two four-beat bursts in succession doubles the burst length to eight beats of signal RDQS1 to provide the same read-access granularity over half the number of DQ links. Memory device 110 thus delivers the data after a training-mode column access time $t_{CACt}$ that is a few clock cycles longer than the normal column access time $t_{CACn}$. The phase and frequency of read clock RDQS1 are held to some prior-trained value. A four-beat write command WR on CA port 115CA1 initiates a write operation similar to the read operation but uses timing reference WCK1 rather than RDQS1.

Referring now to the ports under training, a CA training command CAT on CA port 115CA2 instigates a CA training cycle. The state machine in command decoder 125 causes demultiplexer 122-2 to direct symbols 205 on CA port 115CA2 to CA training circuitry 160-2, which in turn communicates symbols 210 back to controller 105 via mux/demux 145-2, DQ port 115DQ2, and links DQb2. The timing reference for CA signals, write clock WCK2 in this illustration, is retrained during the CA training cycle, and the training cycle can be repeated as needed. Both write clock (WCK) and read clock (RDQS) training may be done intermittently and the calibrated values updated thereafter.

A four-beat read-training command RDT initiates the delivery of read-training data 215 over DQ port 115DQ2 from DQ training circuitry 155-2. Read-training data 215 is comprised of predetermined data values, e.g. pseudo-random patterns, or data stored in training registers, rather than data from memory arrays 130. Transmit parameters of signals from DQ port 115DQ2 and the phase and frequency of read clock RDQS2 are retrained.

A four-beat write-training command WRT from controller 105 is followed by write-training data 220 over DQ port 115DQ2 and an accompanying write-clock signal WCK2 on CK port 115CK2. Receive parameters of signal on DQ port 115DQ2 and the phase and frequency of write clock WCK2 are retrained.

Command, read, and write training can occur in any order, and any or all training can be repeated as needed. When complete, the training mode can be repeated for the other half of interface 115 or the trained parameters are applied to both sides of the interface, in this case for CA port 115CA1 and DQ port 115DQ1, while the recently retrained ports service memory-access requests. Dummy read and write commands can be issued to memory device 110 to simulate the noise environment if normal access requests are idle in the training mode.

To exit the training mode, controller 105 issues a training-mode exit command Tmex on one or both command ports 115CA1 and 115CA2. Thereafter, as illustrated using a write transaction, commands from memory controller 105 arrive on both links CA1 and CA2 over two beats and data is communicated over both links DQb1 and DQb2 over four beats. Memory accesses proceed normally until half of ports 115 are again reserved for training. Retraining the second half of ports 115 is operationally similar to retraining the first half so a detailed discussion is omitted.

Figure 3:
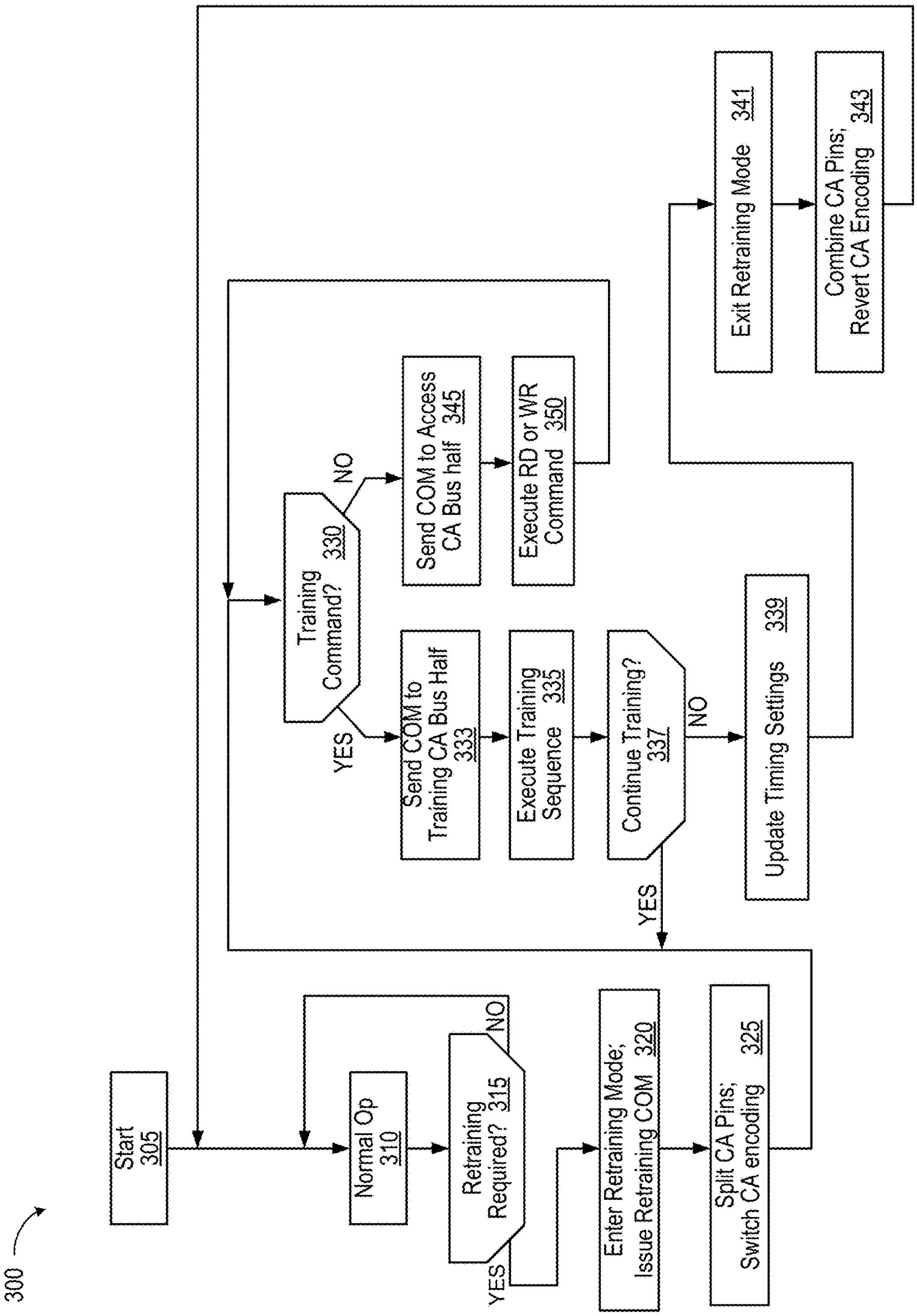
FIG. 3 is a flowchart 300 illustrating a method of combining normal and training modes in memory system 100 of FIG. 1.

FIG. 3 is a flowchart 300 illustrating a method of combining normal and training modes in memory system 100 of FIG. 1. Having started, after an initial training, (305), memory system 100 remains in the normal operating mode (310) until retraining is required, e.g. after a fixed period or in view of bit errors. Retraining can also be initiated responsive to environmental (e.g. voltage and temperature) changes, which can be sensed by reading an oscillator count or die temperature from the memory. Per decision 315, if training is required memory controller 105 enters a training mode and issues a retraining command (320) e.g. like command TM of FIG. 2. Memory controller 105 changes the command-encoding scheme to issue longer and narrower access commands over either one of links CA1 and CA2. At memory device 110, command decoder 125 prepares to receive access and training commands from separate ones of demultiplexers 122-1 and 122-2 (325).

Per decision 330, if controller 105 issues a training command in the training mode the command is conveyed on the one of links CA1 and CA2 reserved for training (333). The training command causes memory 110 to execute a training sequence (335) that senses e.g. timing errors. Per decision 337, this training continues until called off by controller 105, at which point memory 110 updates the settings of the retrained parameters (339). Memory controller 105 then instructs memory 110 to exit the retraining mode (341). Links CA1 and CA2 are recombined and both controller 105 and memory 110 return to the wide-command encoding and decoding scheme (343). If a memory-access command is received in the training mode, decision 330 causes controller 105 to convey the memory-access command over the one of links CA1 and CA2 reserved for memory accesses in the training mode (345). Memory 110 responds by executing the access command, e.g. reading from or writing to arrays 130-1 and 130-2 (350) and awaiting the next command.

Figure 4:
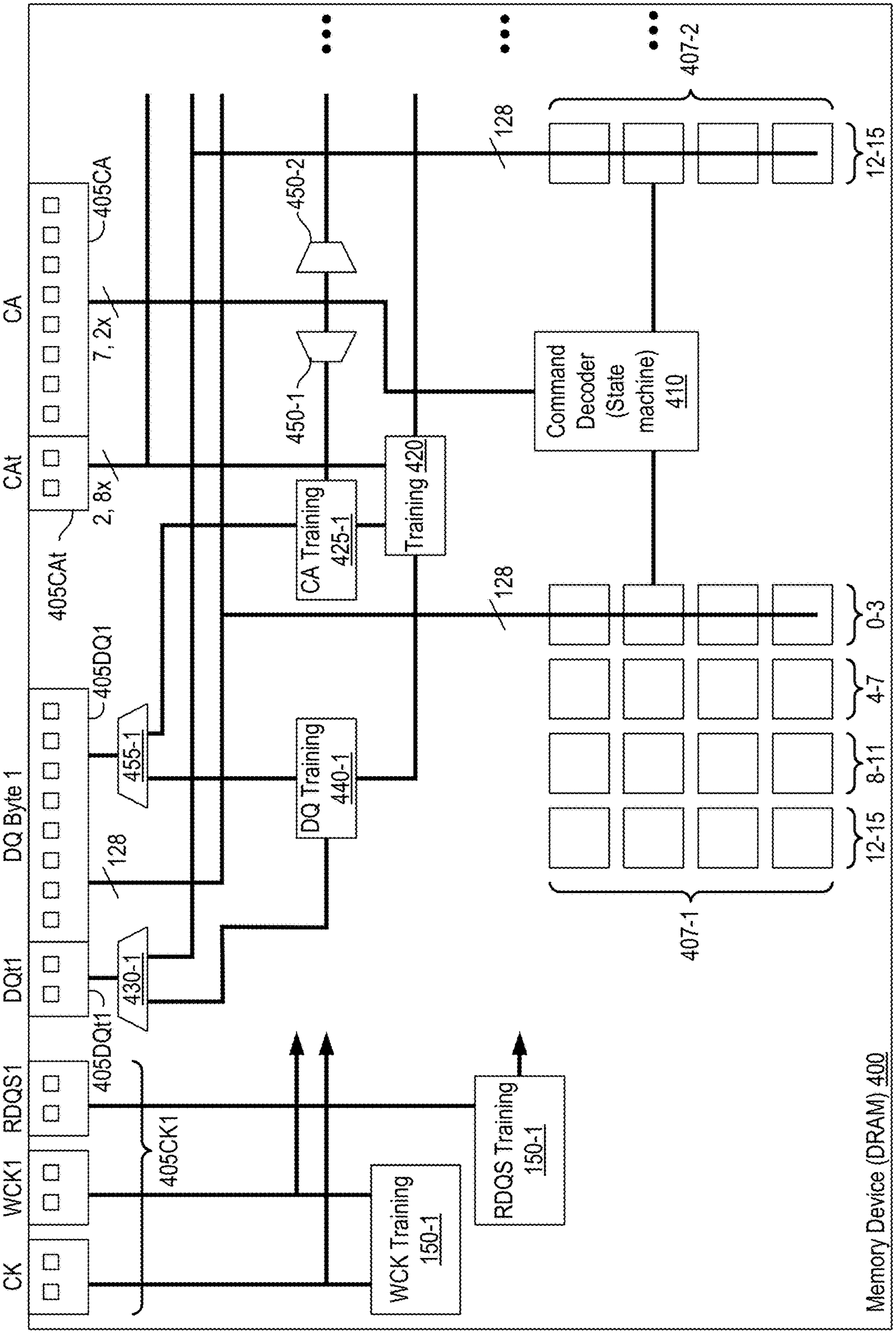
FIG. 4 depicts a memory device 400 with an interface 405 that can be retrained without interfering with normal memory access.

FIG. 4 depicts a memory device 400 with an interface 405 that can be retrained without interfering with normal memory access. As in the example of FIG. 1, memory device 400 is logically divided into first and second halves, with elements of the first and second halves identified using references that terminate with "1" and "2," respectively. Most of the second half is omitted from FIG. 4 for ease of illustration.

Interface 405 includes a byte-wide DQ port 405DQ1 with a two-bit training extension 405DQt1 and a seven-bit CA port 405CA with a two-bit training extension 405CAt. CA signals on port 405CA are passed in two beats of a clock signal to a command decoder 410 that directs read and write accesses to memory arrays 407-1 and 407-2, which communicate 128-bit data via respective DQ ports 405DQ1 and 405DQ2 in burst of e.g. sixteen beats of a read or write clock. Training does not interfere with these access transactions.

Training extensions 405CAt and DQt1 support training. For CA training, in this example, extension 405CAt receives and passes eight-beat bursts of two-bit commands to training circuitry 420, a state machine that directs CA signals from extension 405CAt through CA training circuitry 425-1 and to DQ training extension 405DQt1 via a mux/demux 430-1, which allows extension 405DQt1 to serve as a back channel to the memory controller for CA training. For DQ training, extension 405CAt receives and passes eight-beat bursts of two-bit commands to training circuitry 420, which directs DQ training circuitry 440-1 to transmit and receive DQ training data via DQ training extension 405DQt1 and mux/demux 430-1. Training for DQ or CA signals does not interfere with normal operations, but communication settings for the normal CA and DQ interfaces are updated to reflect calibration that occurs in training.

The signaling environment experienced by extensions 405DQt1 and 405CAt may be sufficiently similar to that of ports 405DQ1 and 405CA that shared calibration settings are sufficient. In other embodiments, extensions 405DQt1 and 405CAt are not fixed, but rather are logical partitions of larger ports that can rotate through the other ports to test individual nodes or sets of nodes. For example, the two nodes of CA extension 405CAt can pairwise substitute for each pair of nodes in port 405CA, leaving the remaining seven pairs to receive and service read and write commands. A pair of multiplexers 450-1 and 450-1 illustrate this potential functionality. A mux/demux 455-1 represents a similar ability to rotate DQ nodes under training.

Memory systems and devices in accordance with other embodiments can have different CA and DQ signaling widths and burst lengths to provide the same or different access granularity. In one such embodiment, byte-wide DQ ports similar to ports 115DQ1 and 115DQ2 of FIG. 1 are divided into nibble-wide groups in the training mode, leaving half of each port to service access transactions for a corresponding memory array. As compared with the embodiment of FIG. 1, this configuration can employ shorter DQ traces within the memory device.

Figure 5:
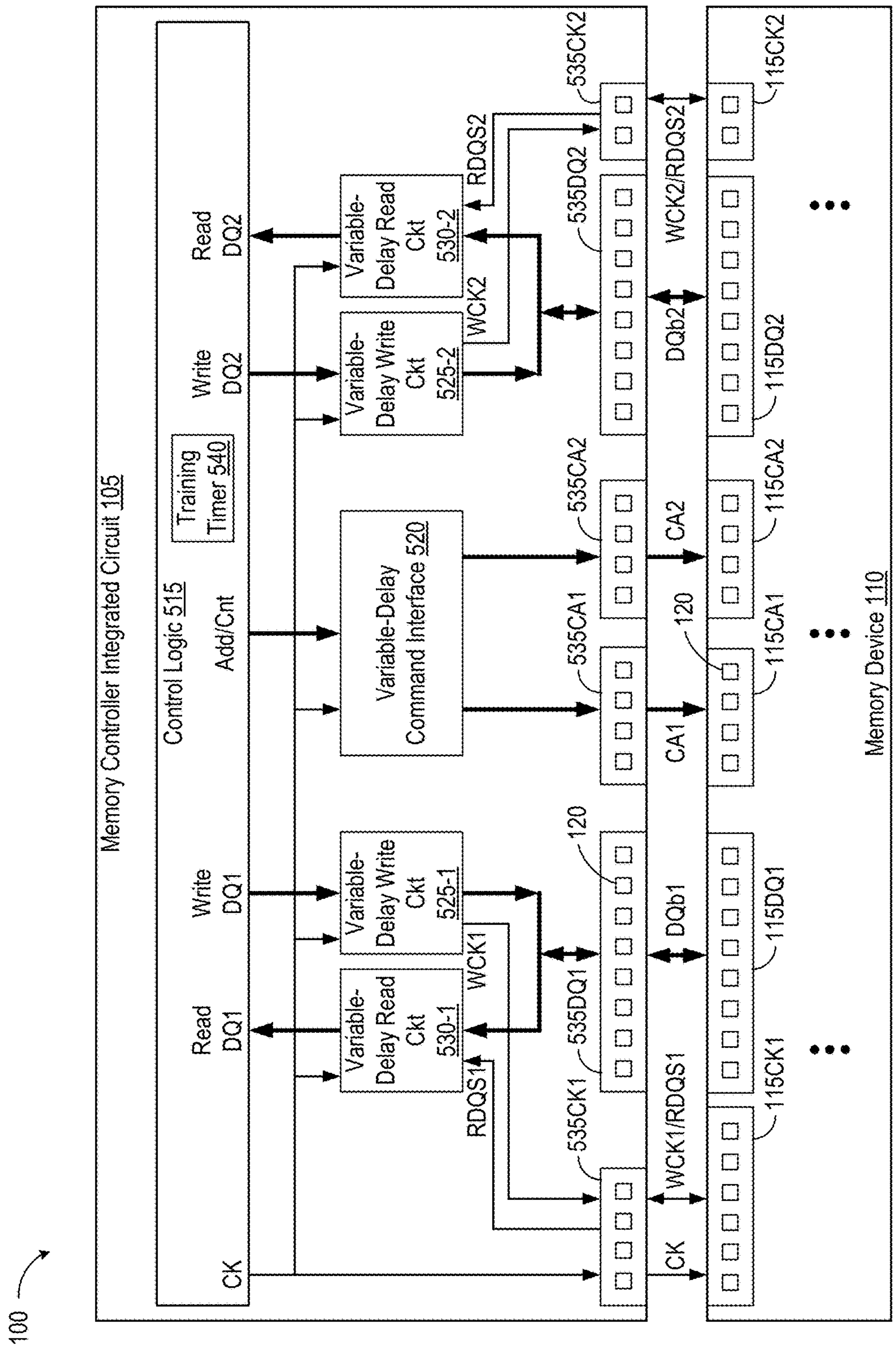
FIG. 5 depicts an embodiment of memory system 100 of FIG. 1 with elements of memory controller 105.

FIG. 5 depicts an embodiment of memory system 100 of FIG. 1 with elements of memory controller 105. In accordance with the depicted embodiment, memory controller 105 adaptively controls the timing of the write strobes WCK1/WCK2 and read strobes RDQS1/RDQS2 to compensate for timing drift of data signals communicated with and within DRAM 110.

Memory controller 105 includes control logic 515 that issues address and control signals Add/Cnt to a command interface 520, conveys byte-wide transmit-data signals Write DQ1 and Write DQ2 to respective variable-delay write circuits 525-1 and 525-2, and receives byte-wide receive-data signals Read DQ1 and Read DQ2 from respective variable-delay read circuits 530-1 and 530-2. A distributed clock signal Ck defines the clock domain for control logic 515, a variable-delay command interface 520, and portions of variable-delay write and read circuits 525 and 530. Respective write and read phase-reference signals (not shown) within read and write circuits 525 and 530, each a phase shifted version of clock signal Ck, respectively define the write and read clock domains.

Memory controller 105 communicates with memory 110 using a memory interface 535 matched to interface 115 of memory 110. Elements of interface 535 have the common prefix "535" and are divided into two sets using the suffixes "1" and "2". Clock signal Ck from control logic 515 is a timing reference for both memory controller 105 and memory device 110. The clock path between memory controller 105 and the various components of memory device 510 impose a clock delay that produces a phase misalignment that is partially responsible for the need for training.

In the normal operational mode, control logic 515 issues commands to memory device 110 via a combined pair of command ports 535CA1 and 535CA2 and communicates via DQ ports 535DQ1 and 535DQ2. In the training mode, instigated by a training timer 540 in this instance, control logic 515 functionally divides command interface 520 in two, effectively dividing interface 535 into two similar sets of ports that operate in the manner detailed above in connection with FIGS. 1-3. Training timer 540 can include registers that store timing settings for circuits 520, 525, and 530. Training cycles can also be initiated responsive to detected data or phase errors. For example, some devices include circuitry that employs error-correction codes (ECC) to detect and correct errors. ECC circuits can produce error-rate measures that can be used to initiate training. Some memory devices output phase information that can be measured against a reference to sense phase shifts that require retraining.

Signal timing within memory controller 105 can be trained and retrained. During a read-training operation for DQ port 535DQ1, memory device 110 issues read data strobe DQSR1 edge-aligned with data DQb1 to memory controller 105. Variable-delay read circuit 530-1 then captures the read data DQb1 using a clock signal phase aligned with a delayed version of read strobe RDQS1. Variable-delay read circuit 530-1 then retimes the captured data to the controller clock domain CK as data Read DQ1. Variable-delay circuit 530-1 maintains the alignment between its internal receive clock signal and read strobe RDQS1 by comparing the phases of these two signals and phase adjusting the internal receive clock signal as needed to reduce any phase difference. Variable-delay circuit 530-2 works the same way. Variable-delay write circuits 525-1 and 525-2 can likewise be calibrated to optimize the timing of controller-side write strobes WCK1 and WCK2 to maintain the delays between those strobes and edges of clock signals CK.

Figure 6:
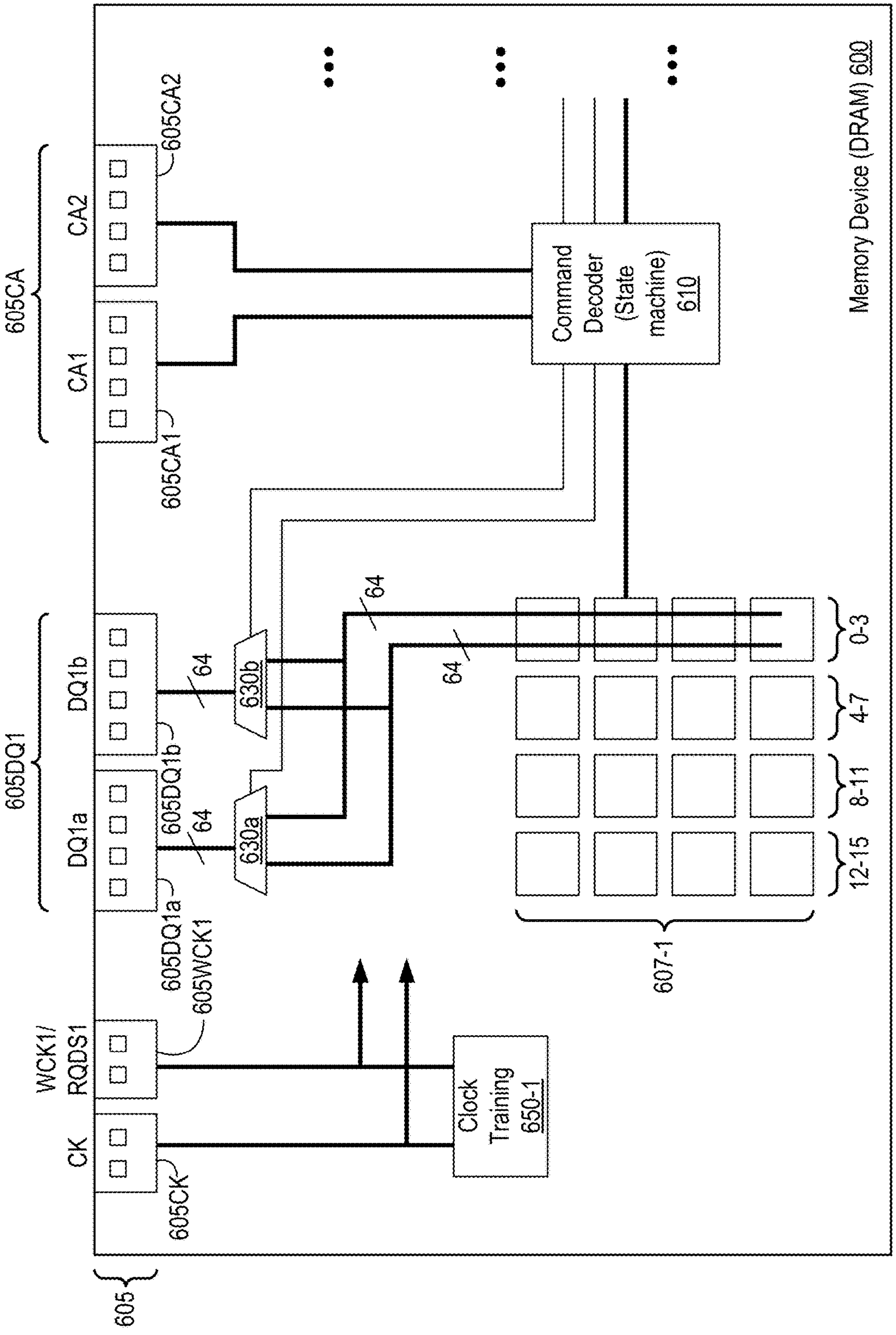
FIG. 6 depicts a memory device 600 with an interface 605 that can be retrained without interfering with normal memory access.

FIG. 6 depicts a memory device 600 with an interface 605 that can be retrained without interfering with normal memory access. As in the example of FIG. 1, memory device 600 is logically divided into first and second halves with elements of the first and second halves identified using references that terminate with "1" and "2," respectively. Each half communicates byte-wide data in a normal operational mode and can be configured to communicate nibble-wide data in a training mode. Most of the second half is omitted from FIG. 6 for case of illustration.

Interface 605 includes clock port 605CK communicating write- and read-clock signals WCK1/RQDS1, a byte-wide data port 605DQ1 divided into two nibble-wide sub-ports 605DQ1*a* and 605DQ1*b*, and a byte-wide command/address port 605CA divided into two nibble-wide sub-ports 605CA1 and 605CA2.

In a normal operating mode, CA signals on port 605CA are passed in two beats of a clock signal CK to a command decoder 610 that directs read and write accesses to a pair of memory arrays, of which only one memory 607-1 is shown. Memory array 607-1 communicates 128-bit data as two groups of 64-bit data over respective sub-ports 605DQ1*a* and 605DQ1*b* via a pair of mux/demuxers 630*a* and 630*b*. In the read (write) direction, data is communicated in byte-wide bursts of sixteen beats of read (write) clock signals RQDS1 (WCK1). In a training mode, command decoder 610 manages memory array 607-1 and multiplexers 630*a* and 630*b* such that one of sub-ports 605DQ1*a* and 605DQ1*b* communicates nibble-wide data in bursts of thirty-two beats and the other of sub-ports 605DQ1*a* and 605DQ1*b* is used for training. CA training can be accomplished in the manner noted previously.

Figure 7:
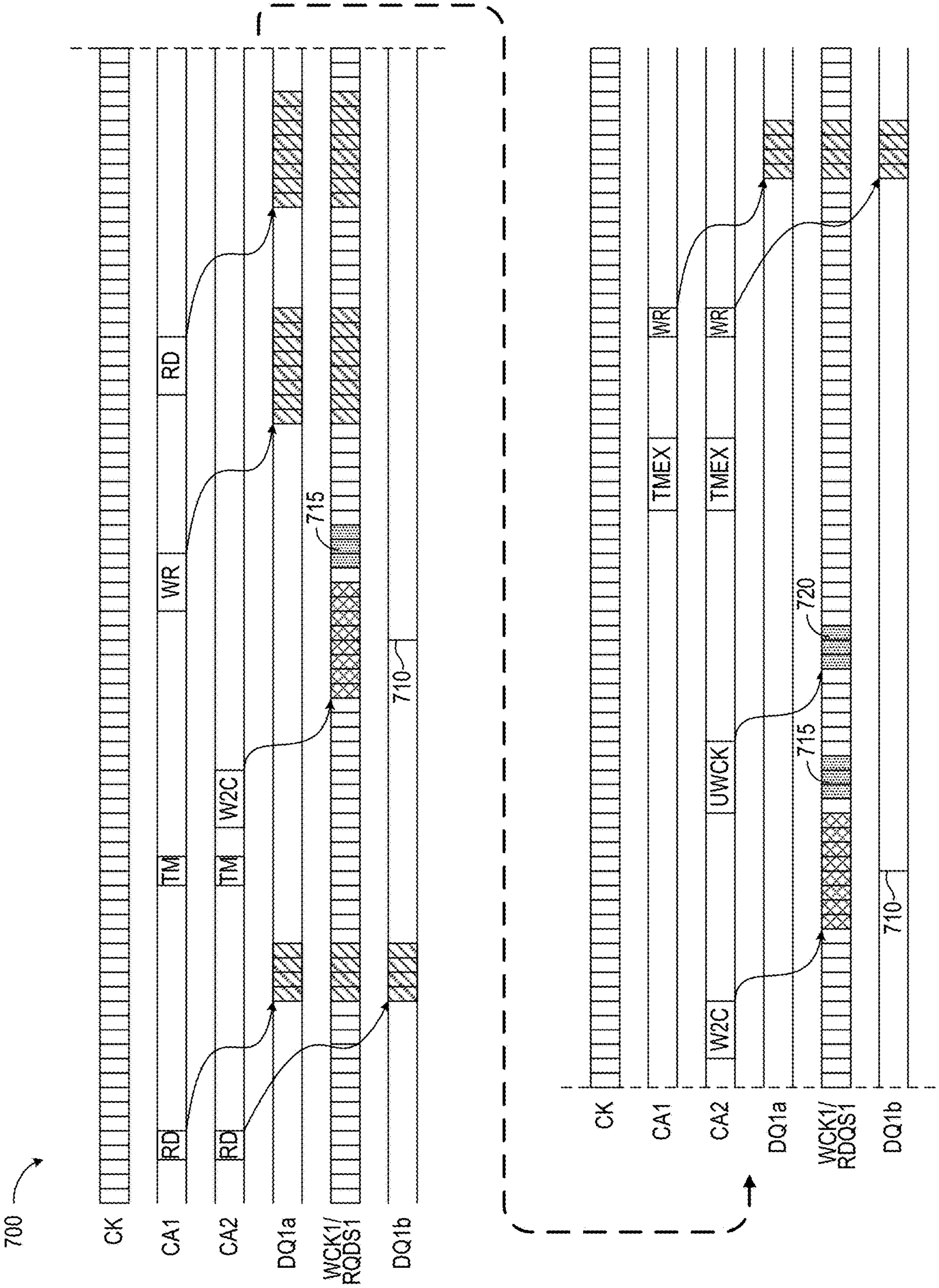
FIG. 7 is a timing diagram 700 illustrating the operation of memory device 600 of FIG. 6.

FIG. 7 is a timing diagram 700 illustrating the operation of memory device 600 of FIG. 6. Diagram 700 starts in a normal operating mode in which both CA sub-ports 605CA1 and 605CA2 serve as a single port. A single read command RD is shown as a pair of sub-commands each with a burst length of two clock cycles (two periods of clock signal CK). Memory device 600 responds to the read command by delivering byte-width data on links DQ1*a* and DQ1*b* at a burst length of sixteen (illustrated over four cycles in FIG. 6 for simplicity) to deliver 128 bits.

A training-mode command TM arrives on both of CA ports 605CA1 and 605CA2 to place memory device 110 in a training mode. This training mode reserves CA port 605CA1 and DQ sub-ports 605DQ1*a* and 605DQ1*b* (not shown) for read and write access. This example illustrates how write-clock signal WCK1 is phase-adjusted; write-clock signal WCK2 and read-clock signals RQDS1 and RQDS2 are trained similarly so a detailed discussion is omitted.

A write-to-clock (W2C) command on port CA2 causes clock-training circuit 650-1 to compare the phase of write-clock signal WCK1 to one or more transitions 710 on port DQ1*b* and responsively generate a phase-error signal. The phase and frequency of write-clock signal WCK1 are adjusted responsive to the phase error. This example assumes write-clock retraining is incomplete when a write command WR is received via command port CA1. Because calibration is incomplete, clock-training circuit 650-1 returns the phase and frequency of write-clock signal WCK1 to the pre-training setting, a process that requires a few clock cycles 715. Thereafter memory 600 issues nibble-wide write data on sub-port 605DQ1*a* in a thirty-two-beat burst. A read command RD on command port CA1 is treated similarly, albeit timed to read-clock signal RQDS1. In some embodiments, a training timer (e.g. training timer 540 in controller 515 of FIG. 5) can include registers that store both calibrated values and training values for write and read clock settings. The training values are held while training is interrupted by a read or write access accomplished using the calibrated values. Registers on memory 600 can likewise store calibrated and training values. For example, a DRAM device or module can have access to or include mode registers to store values for offsets to reference voltage VREF. The controller can sweep the VREF offsets during training and command the DRAM to store the offset values that correspond to e.g. the lowest bit-error rate.

A second write-to-clock command W2C on port CA2 causes clock-training circuit 650-1 to once again compare the phase of write-clock signal WCK1 to one or more transitions 710 on port DQ1*b*. The phase and frequency of write-clock signal WCK1 are again adjusted responsive to the phase error. Some number of these clock-cycle-training transactions, interspersed with read and write transactions, eventually provides an updated phase and frequency calibration for write-clock signal WCK1. When satisfactory calibration is complete, the memory controller issues a command UWCK that causes command decoder 610 to update the timing settings for write-clock signal WCK1, a process that takes a few clock cycles 720. A training-mode exit command TMEX from the memory controller than returns memory 600 to the normal, full-width access mode with write-clock signal WCK1 retrained. The last command in the illustration of FIG. 7 is a full-width write command with byte-wide write data communicated over both sub-ports 605DQ1*a* and 605DQ1*b* in time with the retrained write-clock signal WCK1.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A memory device comprising:

a command interface having a first command port and a second command port;

a command decoder having a first input coupled to the first command port and a second input coupled to the second command port, the command decoder to receive, as an input on both the first command port and the second command port, a first command, and to decode the first command in a wide-data mode and to receive, as an input on one of the first command port and the second command port, a second command, and to decode the second command in a narrow-data mode;

a data interface having a first data port to communicate first data signals and a second data port to communicate second data signals; and a data switch coupled to the data interface, the data switch communicating the first data signals concurrently with the second data signals over both the first data port and the second data port in the wide-data mode and communicating the first data signals in succession with the second data signals over one of the first data port and the second data port in the narrow-data mode.

2. The memory device of claim 1, further comprising a first memory connected to the data switch to store the first data signals and a second memory connected to the data switch to store the second data signals.

3. The memory device of claim 2, wherein the first memory comprises a first array of memory banks and the second memory comprises a second array of memory banks.

4. The memory device of claim 1, further comprising a command-training circuit selectively coupled to one of the first data port and the second data port via the data switch, the command-training circuit to convey training data over the one of the first data port and the second data port in the narrow-data mode.

5. The memory device of claim 4, further comprising a command switch coupled to the first command port to direct the training data from the first command port to the command-training circuit.

6. The memory device of claim 1, wherein the first command port and the second command port include equal numbers of command pads.

7. The memory device of claim 1, wherein the data switch communicates the first data signals and the second data signals at a faster data rate in the wide-data mode relative to the narrow-data mode.

8. The memory device of claim 7, wherein the faster data rate is double the data rate in the narrow-data mode.

9. A memory controller comprising:

a command interface having a first command port and a second command port, the command interface to drive a wide command as an output on both the first command port and the second command port in a full-width mode and to drive a narrow command as an output on one of the first command port and the second command port in a narrow, training mode;

a data interface having a first data port to communicate first data signals and a second data port to communicate second data signals; and control logic coupled to the command interface and the data interface, the control logic to communicate wide data over both the first data port and the second data port in the full-width mode and to communicate narrow data over one of the first data port and the second data port in the narrow, training mode.

10. The memory controller of claim 9, wherein the command interface issues the wide command over a number of clock cycles and issues the narrow command over more than the number of clock cycles.

11. The memory controller of claim 10, wherein the command interface issues the narrow command over twice the number of clock cycles.

12. The memory controller of claim 10, wherein the first command port and the second command port include equal numbers of command pads.

13. The memory controller of claim 9, further comprising a first variable-delay read circuit between the control logic and the first data port and a second variable-delay read circuit between the control logic and the second data port.

14. The memory controller of claim 9, further comprising a first variable-delay write circuit between the control logic and the first data port and a second variable-delay write circuit between the control logic and the second data port.

* * * * *